(12) United States Patent
Helgerson

(10) Patent No.: US 12,188,478 B2
(45) Date of Patent: Jan. 7, 2025

(54) METHOD AND SYSTEM FOR CONTROLLING DIFFERENTIAL PRESSURE FOR AN EXTERNALLY PRESSURIZED GAS BEARING APPARATUS

(71) Applicant: TRANE INTERNATIONAL INC., Davidson, NC (US)

(72) Inventor: Jacob T. Helgerson, La Crosse, WI (US)

(73) Assignee: TRANE INTERNATIONAL INC., Davidson, NC (US)

( * ) Notice: Subject to any disclaimer, the term of this patent is extended or adjusted under 35 U.S.C. 154(b) by 332 days.

(21) Appl. No.: 17/646,667

(22) Filed: Dec. 30, 2021

(65) Prior Publication Data

US 2023/0213037 A1  Jul. 6, 2023

(51) Int. Cl.
*F04D 25/06* (2006.01)
*F04D 17/12* (2006.01)
(Continued)

(52) U.S. Cl.
CPC ....... *F04D 25/0606* (2013.01); *F04D 17/122* (2013.01); *F04D 29/0513* (2013.01);
(Continued)

(58) Field of Classification Search
CPC ............... F04D 25/0606; F04D 17/122; F04D 29/0513; F04D 29/057; F04D 29/063;
(Continued)

(56) References Cited

U.S. PATENT DOCUMENTS

2007/0212232 A1* 9/2007 De Larminat ........ F04C 29/045
417/83
2015/0345265 A1* 12/2015 Cunningham ...... F04D 29/0413
415/104
(Continued)

FOREIGN PATENT DOCUMENTS

| CN | 111578566 A | 8/2020 | |
|---|---|---|---|
| CN | 110425176 B | 10/2020 | |
| WO | WO-2020039006 A1 * | 2/2020 | ............. F04D 17/10 |

OTHER PUBLICATIONS

Pdf is original document of foreign reference WO 2020039006 A1 (Year: 2020).*

(Continued)

*Primary Examiner* — Len Tran
*Assistant Examiner* — Kamran Tavakoldavani
(74) *Attorney, Agent, or Firm* — HSML P.C.

(57) ABSTRACT

A heat transfer circuit includes a compressor, a condenser, an expander, and an evaporator that are fluidly connected together. The compressor includes a housing and a shaft rotatable relative to the housing to compress a working fluid received at a suction inlet, in which the shaft is supported by a gas bearing, and the gas bearing including a bearing housing having a fluid inlet and an outlet. A high pressure gas source is fluidly connected to the fluid inlet of the bearing housing for supplying high pressure fluid to the fluid inlet of the gas bearing such that the gas bearing supports the shaft when the shaft is rotating. A pressure reducer connected to the outlet of the gas bearing is provided for reducing a vent pressure of the gas bearing.

16 Claims, 4 Drawing Sheets

(51) Int. Cl.

| | |
|---|---|
| *F04D 29/051* | (2006.01) |
| *F04D 29/057* | (2006.01) |
| *F04D 29/063* | (2006.01) |
| *F04D 29/28* | (2006.01) |
| *F04D 29/42* | (2006.01) |
| *F04D 29/58* | (2006.01) |
| *F16C 32/06* | (2006.01) |

(52) U.S. Cl.
CPC ......... *F04D 29/057* (2013.01); *F04D 29/063* (2013.01); *F04D 29/286* (2013.01); *F04D 29/4206* (2013.01); *F04D 29/5806* (2013.01); *F16C 32/0618* (2013.01); *F16C 32/064* (2013.01); *F16C 32/0662* (2013.01); *F16C 32/0696* (2013.01); *F16C 2360/44* (2013.01)

(58) Field of Classification Search
CPC ............... F04D 29/286; F04D 29/4206; F04D 29/5806; F16C 32/0618; F16C 32/064; F16C 32/0662; F16C 32/0696; F16C 2360/44; F25B 31/00; F25B 49/022; F25B 2400/07; F25B 2400/077
See application file for complete search history.

(56) References Cited

U.S. PATENT DOCUMENTS

| | | | |
|---|---|---|---|
| 2016/0040915 | A1 | 2/2016 | Jonsson et al. |
| 2017/0248346 | A1* | 8/2017 | Creamer ............. F04C 18/0207 |
| 2017/0370364 | A1 | 12/2017 | Gu et al. |
| 2018/0038380 | A1* | 2/2018 | Morgan ............. F04D 27/0276 |
| 2021/0095682 | A1 | 4/2021 | Jeung et al. |
| 2021/0131568 | A1* | 5/2021 | Nakaniwa ............... F01D 11/04 |
| 2021/0172458 | A1* | 6/2021 | Oh ......................... F04D 17/10 |

OTHER PUBLICATIONS

Extended European Search Report, European Patent Application No. 22213797.8, May 23, 2023 (9 pages).

* cited by examiner

METHOD AND SYSTEM FOR CONTROLLING DIFFERENTIAL PRESSURE FOR AN EXTERNALLY PRESSURIZED GAS BEARING APPARATUS

FIELD

This description relates generally to a bearing for a heating, ventilation, air conditioning, and refrigeration (HVACR) system. More specifically, this description relates to an externally pressurized gas bearing for a compressor in the HVACR system.

BACKGROUND

A heating, ventilation, air conditioning, and refrigeration (HVACR) system generally includes a compressor. Compressors, such as, but not limited to, centrifugal compressors, screw compressors, and scroll compressors, utilize bearings to support a spinning shaft. Various types of bearings have been considered, including hydrodynamic oil bearings and ball bearings, which require a lubricant system. In some circumstances, an oil-free operation is preferred. Such systems often utilize a magnetic bearing. Magnetic bearings do not utilize a lubricant, but can be expensive and require a control system.

HVACR systems can be utilized for a building or may be utilized in a transport application (e.g., trucks, cars, buses, trains, etc.).

SUMMARY

This description relates generally to a bearing for a heating, ventilation, air conditioning, and refrigeration (HVACR) system. More specifically, this description relates to a gas bearing for a compressor in the HVACR system that uses a pressurized fluid to form a thin film at least between the gas bearing and a shaft of the compressor.

In an embodiment, a gas bearing is disclosed. The gas bearing can be used to, for example, support a shaft such as, but not limited to, a compressor shaft of a compressor in an HVACR system. In an embodiment, the compressor can be a centrifugal compressor. In an embodiment, the centrifugal compressor is an oil-free centrifugal compressor.

A heat transfer circuit is disclosed. The heat transfer circuit includes a compressor, a condenser, an expander, and an evaporator that are fluidly connected together. The compressor includes a housing and a shaft rotatable relative to the housing to compress a working fluid received at a suction inlet, in which the shaft is supported by a gas bearing and the gas bearing includes a bearing housing having a fluid inlet and an outlet. The heat transfer circuit also includes a high pressure gas source fluidly connected to the fluid inlet of the bearing housing for supplying high pressure fluid to the fluid inlet of the gas bearing such that the gas bearing is configured to support the shaft when the shaft is rotating and includes a pressure reducer connected to the outlet of the gas bearing for reducing an outlet pressure of the gas bearing.

A method for controlling a differential pressure across a gas bearing is disclosed. The gas bearing supports a shaft of a compressor for a heat transfer circuit, in which the heat transfer circuit includes the compressor, a condenser, an expander, and an evaporator that are fluidly connected together. The method includes the steps of compressing a working fluid received at a suction inlet of the compressor by rotation of the shaft; receiving a fluid from a high pressure gas source at a fluid inlet of a bearing housing of the gas bearing; venting the fluid from the bearing housing at an outlet of the bearing housing; and reducing an outlet pressure of the fluid vented from the outlet of the bearing housing.

BRIEF DESCRIPTION OF THE DRAWINGS

References are made to the accompanying drawings that form a part of this disclosure and which illustrate embodiments in which the systems and methods described in this specification can be practiced.

Like reference numbers represent like parts throughout.

DETAILED DESCRIPTION

Figure 1:
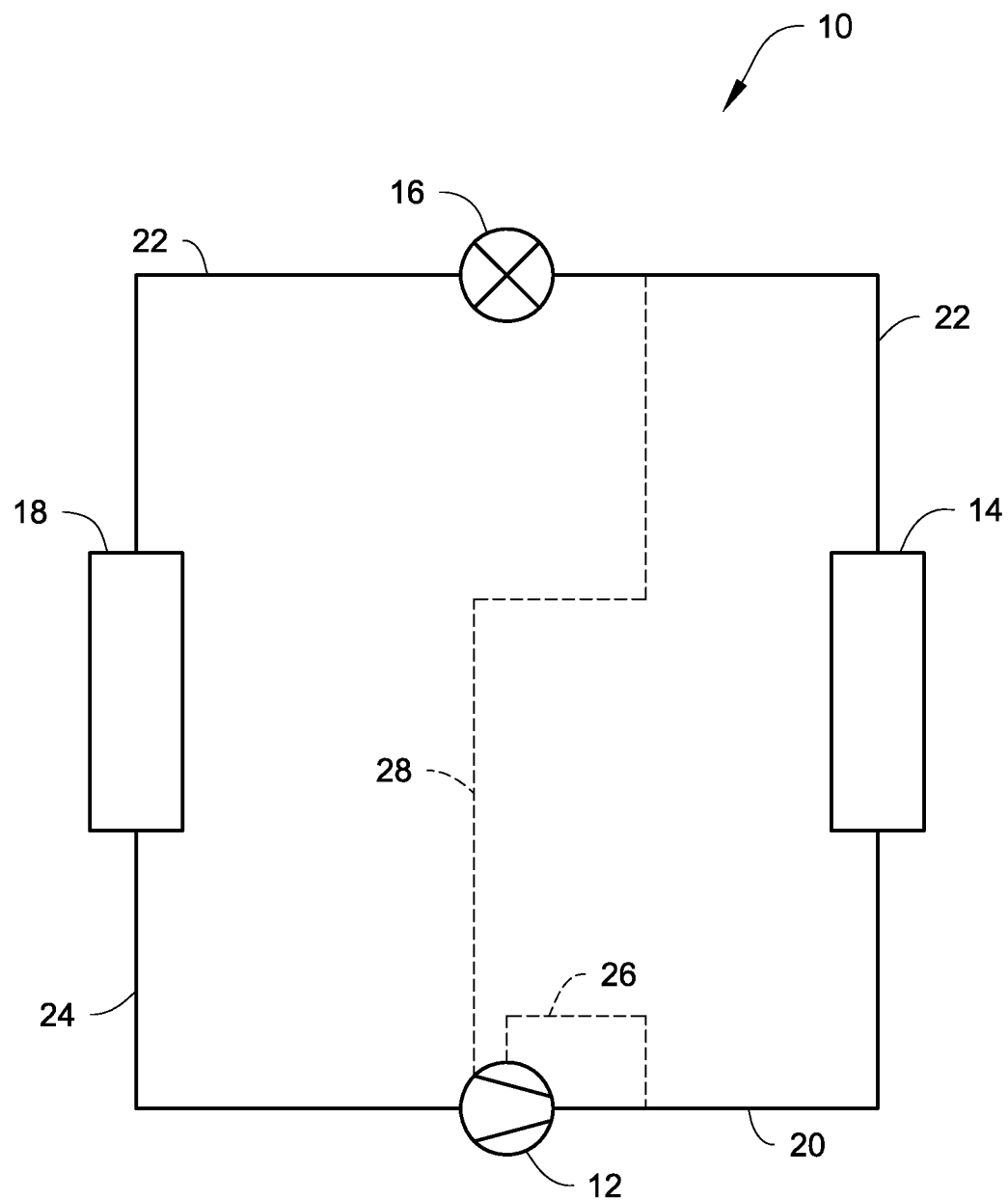
FIG. 1 is a schematic diagram of a refrigeration circuit, according to an embodiment.

This description relates generally to a bearing for a heating, ventilation, air conditioning, and refrigeration (HVACR) system. More specifically, this description relates to a gas bearing for a compressor in the HVACR system that uses a pressurized fluid to form a thin film between the gas bearing and a shaft of the compressor. It is appreciated that the gas bearing can be used as at least one of a radial bearing, an axial bearing or a thrust bearing, or combination thereof.

In an embodiment, the gas bearing can be utilized in place of a hydrodynamic oil bearing, a ball bearing, a magnetic bearing, or the like. In particular, the gas bearing can be utilized in a compressor (e.g., a centrifugal compressor, etc.) of an HVACR system to provide a lubricant free system. During operations of the compressor, the compressor can operate at high rotational speeds, e.g., at or around 10,000 rpms and up to 50,000 rpms and further up to 150,000 rpms or therebetween, in which the gas bearing is configured to use a pressurized fluid to form a thin film of fluid at a differential pressure to support the rotating shaft by maintaining the clearance between the bearing and the rotating shaft. The differential pressure can be a pressure difference of the inlet and outlet of the gas bearing in which a higher differential pressure provides a greater force acting on the non-fixed member, e.g., the shaft of the compressor. Typically, in order for the compressor to operate stably at such high speeds, the differential pressure across the gas bearing can be controlled at, for example, at least 40 PSI to provide the fluid film. In an embodiment, the differential pressure is at least 60 PSI. In an embodiment, the differential pressure is at or about 100 PSI. By controlling and/or maintaining the differential pressure, for example at a predetermined value, the shaft can be prevented from rotating non-synchronously with respect to the gas bearing, which may increase the size of the orbit of the shaft with respect to the gas bearing(s), for example, from rotor whirl due to cross-coupled forces, e.g., due to the discharge pressure of the compressor, imbalances, rubbing of components, increased speed of the compressor, pressure distribution in the impeller shroud and hub cavities and/or seal cavity, or the like.

During the operation of the compressor, the differential pressure may need to be controlled or adjusted to prevent and/or reduce the non-synchronous rotation of the shaft with respect to the gas bearing. For example, the operating conditions in the HVACR system may change, for example, due to decreased load and/or decreased discharge pressure of the compressor, which may result in a lower differential pressure across the gas bearing if the high pressure fluid is supplied from the heat transfer circuit. Further, as the rotational speed of the compressor increases, a higher differential pressure may be needed to provide the proper support of the rotating shaft. Thus, in order to prevent damage to the compressor, various means are disclosed herein to control and/or maintain the differential pressure.

In the embodiments disclosed herein, the differential pressure can be controlled using various pressure reducers to control and/or maintain the differential pressure across the gas bearing at a determined value as the operating conditions of the HVACR system change by raising or lowering the vent pressure of the gas bearing. Additionally, embodiments disclosed in this specification can include a gas bearing that utilizes refrigerant as the working fluid, which can provide advantageous heat transfer properties to reduce a likelihood of bearing seizure due to thermal expansion of a shaft supported by the gas bearing.

A gas bearing, as used in this specification, can be an aerostatic bearing or a hybrid bearing, e.g., aerostatic and aerodynamic bearing properties, in which the bearing is at least partially supplied a high pressure fluid. The aerostatic bearing or hybrid bearing includes a gas distributing structure that distributes a high pressure fluid between a non-fixed member, e.g., shaft of a compressor, and the fixed supporting member of the compressor, e.g., housing. In such a manner, a layer of flowing high pressure fluid is formed to support the non-fixed member against radial and/or axial load. The aerostatic bearing is an "aerostatic" type bearing as it forms a layer of flowing fluid between its bearing surfaces from an incoming flow of high pressure fluid. The hybrid bearing includes the aerostatic bearing property and can also include aerodynamic properties in which the hybrid bearing also relies on the movement (e.g. the rotation) of the shaft to form a cushion of fluid between the shaft and the housing. For example, the aerostatic bearing can be a foil bearing or a groove bearing and the hybrid bearing can be a foil bearing, a groove bearing, or a bearing made of porous media comprising a carbon-graphite material, or a combination thereof to have the aerostatic and/or aerodynamic properties. In an embodiment, the hybrid bearing can be a fixed geometry orifice fed hybrid gas bearing, such as a tri-lobe (which includes 2, 3, or more) orifice fed bearing, or tilt pad orifice fed, in which the orifice feed is aerostatic while the pad configurations, e.g., fixed geometry, tilt pad, flexure pivot, include more aerodynamic properties. In an embodiment, the high pressure fluid can be a gas. In an embodiment, the high pressure fluid can be a mixture of a gas and a liquid.

It is appreciated that the term support as used herein is at least directed to providing support against axial (thrust) and/or radial loads that can be applied to a compressor. For example, a gas bearing can support a shaft of a compressor by being provided around the shaft such that the gas bearing supports the shaft against radial loads that are perpendicular to the direction of the shaft. In another embodiment, the gas bearing can support the shaft of a compressor by being provided around a thrust surface of the shaft or against the thrust surface of the shaft such that the gas bearing supports the shaft against axial loads that are parallel to the direction of the shaft. For example, the shaft can include a thrust surface at one end of the shaft that is supported by the gas bearing or a thrust collar that is press-fitted or attached to the shaft, in which the gas bearing is provided around the thrust surface of the thrust collar.

FIG. 1 is a schematic diagram of a heat transfer circuit 10, according to an embodiment. The heat transfer circuit 10 generally includes a compressor 12, a condenser 14, an expander 16, and an evaporator 18.

The heat transfer circuit 10 is an example and can be modified to include additional components. For example, in an embodiment, the heat transfer circuit 10 can include other components such as, but not limited to, an economizer heat exchanger, one or more flow control devices, a receiver tank, a dryer, a suction-liquid heat exchanger, or the like.

The heat transfer circuit 10 can generally be applied in a variety of systems used to control an environmental condition (e.g., temperature, humidity, air quality, or the like) in a space (generally referred to as a conditioned space). Examples of such systems include, but are not limited to, HVACR systems, transport refrigeration systems, or the like.

The compressor 12, condenser 14, expander 16, and evaporator 18 are fluidly connected via refrigerant lines 20, 22, 24. In an embodiment, the refrigerant lines 20, 22, and 24 can alternatively be referred to as the refrigerant conduits 20, 22, and 24, or the like.

In an embodiment, the heat transfer circuit 10 can be configured to be a cooling system (e.g., an air conditioning system) capable of operating in a cooling mode. In an embodiment, the heat transfer circuit 10 can be configured to be a heat pump system that can operate in both a cooling mode and a heating/defrost mode.

The heat transfer circuit 10 can operate according to generally known principles. The heat transfer circuit 10 can be configured to heat or cool a gaseous process fluid (e.g., a heat transfer medium or fluid such as, but not limited to, air or the like), in which case the heat transfer circuit 10 may be generally representative of an air conditioner or heat pump.

In operation, the compressor 12 compresses a working fluid (e.g., a heat transfer fluid such as a refrigerant or the like) from a relatively lower pressure gas to a relatively higher-pressure gas. In an embodiment, the compressor 12 can be a centrifugal compressor. In an embodiment, the centrifugal compressor can operate at different speed ranges based on, for example, the compressor size and type. For example, in an embodiment, the centrifugal compressor can operate from at or about 10,000 revolutions per minute (RPM) to at or about 50,000 revolutions per minute (RPM) and up to at or about 150,000 revolutions per minute (RPM), or therebetween. In an embodiment, the compressor 12 can be a screw compressor, a scroll compressor, or the like.

The relatively higher-pressure gas is also at a relatively higher temperature, which is discharged from the compressor 12 and flows through refrigerant line 20 to the condenser 14. The working fluid flows through the condenser 10 and rejects heat to a process fluid (e.g., water, air, etc.), thereby cooling the working fluid. The cooled working fluid, which is now in a liquid form, flows to the expander 16 via the refrigerant line 22. The expander 16 reduces the pressure of the working fluid. As a result, a portion of the working fluid is converted to a gaseous form. Expander 16 may be, for example, an expansion valve, orifice, expansion plate, expansion vessel, or other suitable device to reduce pressure of a working fluid such as the working fluid. In an embodiment, expander 16 includes multiple orifices. In an embodiment, the multiple orifices of expander 16 have different sizes. Expander 16 may be a controllable expansion device having a variable aperture. In an embodiment, expander 16 is an electronic expansion valve.

The working fluid, which is now in a mixed liquid and gaseous form flows to the evaporator 18 via refrigerant line 22. The working fluid flows through the evaporator 18 and absorbs heat from a process fluid (e.g., water, air, etc.), heating the working fluid, and converting it to a gaseous form. The gaseous working fluid then returns to the compressor 12 via the refrigerant line 24. The above-described process continues while the refrigerant circuit is operating, for example, in a cooling mode (e.g., while the compressor 12 is enabled).

In the illustrated embodiment, a first fluid line 26 can be connected at a location at which a high pressure fluid may be drawn from the heat transfer circuit 10 and provided as a high pressure gas to a gas bearing in the compressor 12. For example, the high pressure gas is fluidly connected to a fluid inlet of a bearing housing for supplying high pressure fluid to the gas bearing. In an embodiment, fluid line 26 can be connected at a location at which fluid provided to the gas bearing is gaseous or substantially gaseous. The high pressure gas source can include, or alternately include, a second fluid line 28 that can be connected at a location at which fluid may be drawn from the refrigerant line 22 and provided to the bearing housing. In an embodiment, fluid line 28 can be connected at a location at which fluid provided to the gas bearing is in a mixed state including at least a portion that is liquid and at least a portion that is gaseous. It will be appreciated that the first fluid line 26 can be included in the refrigerant circuit 10, the second fluid line 28 can be included in the refrigerant circuit 10, or both the first and second fluid lines 26, 28 can be included in the refrigerant circuit 10. It will be appreciated that the high pressure gas source can also be a fluidly separate high pressure gas source that includes a receiver tank for receiving the working fluid from the first fluid line 26 and/or the second fluid line 28 or another refrigerant supply before going to the compressor 12, and it will be appreciated that in some embodiments the high pressure gas source can include additional equipment, for example, a pump, a heater, filter, secondary compressor, such as a linear diaphragm, piston, or similar compressor, or the like for processing the working fluid.

Figure 2:
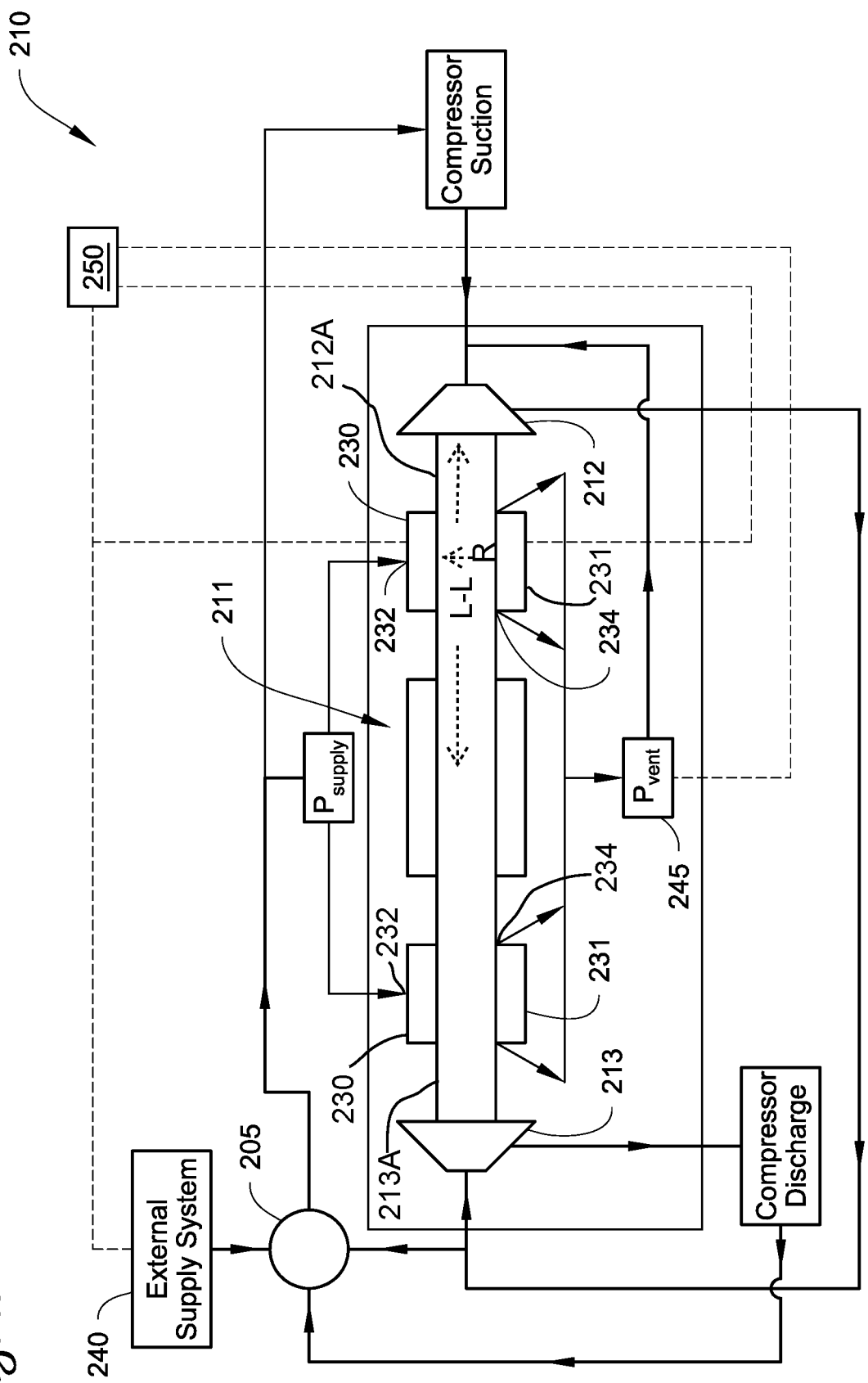
FIG. 2 is a schematic view of a gas bearing having a pressure reducer, according to an embodiment.

FIG. 2 is a schematic view of an embodiment of a gas bearing with a pressure reducer, according to an embodiment. The gas bearing 230 in FIG. 2 can be utilized in a compressor (e.g., compressor 12 in FIG. 1) of a heat transfer circuit (e.g., heat transfer circuit 10 in FIG. 1) of an HVACR system. FIG. 2 illustrates the flow path of the working fluid through a heat transfer circuit 210 and the gas bearing. The heat transfer circuit 210 can include a compressor 211, a high pressure gas source 205 that can include heat transfer circuit components, such as a condenser, an expander, and an evaporator, and gas bearings 230. In an embodiment, the compressor 211 can be a single stage, two-stage, or multi-stage compressor which can be a centrifugal compressor, a screw compressor, a scroll compressor, or the like. In an embodiment of the centrifugal compressor, the centrifugal compressor can operate at different speed ranges based on, for example, the compressor size and type. For example, in an embodiment, the centrifugal compressor can operate from at or about 10,000 revolutions per minute (RPM) to at or about 50,000 revolutions per minute (RPM) and up to at or about 150,000 revolutions per minute (RPM) or therebetween. The centrifugal compressor includes a housing and a shaft that rotates relative to the housing at the controlled RPMs.

The compressor 211, as shown in FIG. 2, is a two-stage centrifugal compressor, in which a first-stage centrifugal compressor 212 compresses the working fluid and supplies the compressed working fluid to a second-stage centrifugal compressor 213, which further compresses the working fluid to the desired outlet pressure, e.g., based on temperature and/or pressure needs of the system. The relatively higher-pressure gas is discharged from the compressor 213 and flows through refrigerant lines to the various heat transfer circuit components, e.g., the condenser, expander, and evaporator. Along the various heat transfer circuit components, the working fluid can be provided to the gas bearing or can be provided to a fluidly separate external supply system 240 for supplying high pressure fluid to the gas bearing. The external supply system 240 can include various components, for example, a receiver tank, a heater, a pump, a filter, or other processing equipment for the working fluid. While the external supply system 240 has been discussed as receiving the working fluid from the heat transfer circuit 210, it is appreciated that the external supply system 240 can also be supplied working fluid from another system, e.g., from a second compressor in a separate heat transfer circuit.

The gas bearings 230 radially support the shafts 212A, 213A of the first-stage centrifugal compressor 212 and the second-stage centrifugal compressor 213 in the housing of the compressor. Each of the gas bearings 230 can include a bearing housing 231 having a fluid inlet 232 and an outlet 234. The high pressure gas source 205 is fluidly connected to the fluid inlet 232 of the bearing housing 231 for supplying high pressure fluid. The gas bearing 230 is configured such that the gas bearing uses the high pressure fluid to form a fluid layer between the surface of the gas bearing and the shaft to radially support the shaft of the compressors 212, 213. In an embodiment, the fluid inlet 232 of the bearing housing 231 is connected to the high pressure gas source 205 which is connected to at least one refrigerant line of the heat transfer circuit components and/or to the external supply system 240 of the high pressure fluid.

The outlet(s) 234 of the bearing housing(s) 231 is fluidly connected to the suction of the first-stage compressor 212 and/or connected to a pressure reducer 245 that is connected to the suction of the first-stage compressor 212 for venting the gas bearing 230. It is appreciated that each of the outlet(s) of the bearing housing(s) 231 from the gas bearings on the first-stage compressor 212 and/or the second-stage compressor 213 can be combined as a single inlet to the suction of the first-stage compressor 212 and/or to the pressure reducer 245. Thus, the pressure reducer 245 can be used to lower the vent pressure of the gas bearings 230 so that the differential pressure can be controlled and/or maintained across the gas bearings 230 at a determined value. The differential pressure can be controlled and/or maintained to have a pressure difference of the inlet and outlet of the gas bearing 230 of at least 40 PSI, preferably at least 60, and preferably around 100 PSI. It is appreciated that the upper limit of the differential pressure can be determined by the bearing construction, e.g., subjected to the discharge pressure of the compressor. The pressure reducer 245 can be a venturi, an eductor, an ejector, a vacuum pump, or similar device, or can utilize the components of the compressor to reduce the outlet pressure, e.g., by adjusting the inlet guide vanes of a centrifugal compressor or suction valve of a screw compressor.

While FIG. 2 shows the gas bearing(s) 230 as a single unit, it is appreciated that the gas bearing(s) 230 can be a single bearing or multiple bearings that radially support the shaft(s) in which each bearing receives the high pressure fluid at the fluid inlet of the respective bearing housing and vents the working fluid at the outlet of the respective bearing to the suction of the compressor. For example, the gas bearing(s) 230 can include a plurality of radial bearings that radially support the respective shaft of the first-stage compressor and the second-stage compressor so that the shaft rotates concentrically within the gas bearing by forming a fluid layer between the shaft and a surface layer of the gas bearing. In addition to or alternatively, the gas bearing(s) 230 can include multiple inlets and multiple outlets for distributing the high pressure fluid between the shaft and the bearing housing(s). It is appreciated that the distributed high pressure fluid is pressed between the surface layer and the shaft such that it forms a layer of flowing pressurized fluid between the bearing housing(s) and the shaft(s). This layer of flowing pressurized gas supports the shaft in the radial direction and the radial loads produced by the compressor. In such a manner, the gas bearing(s) supports the shaft and its radial load to ensure that the shaft stays in its correct position in the radial direction.

For example, in a non-limiting embodiment, a shaft can be provided within an aperture of the bearing housing 231. The shaft includes a longitudinal axis L-L that extends along a length of the shaft. In an embodiment, a clearance between the shaft and the gas bearing 230 can be at or about 2 microns to at or about 100 microns. In an embodiment, the clearance can be about or less than 25 microns. A larger clearance means lower stiffness and larger leakage through the gas bearing 230. The selection of the clearance can depend, for example, upon the required stiffness of the rotor-bearing system. In operation, the shaft rotates about the longitudinal axis L-L. The shaft is subject to deflection in the radial direction R. To reduce an amount of movement in the radial direction, the pressure reducer 245 can be used to reduce the outlet pressure of the gas bearing 230 to increase the differential pressure across the gas bearing 230. In an embodiment, the differential pressure can be, e.g., at or above 60 PSI. While the gas bearings 230 have been discussed with respect to radial bearings, it is appreciated that the gas bearings 230 can also include radial bearings, axial bearings or thrust bearings, or combinations thereof. For example, in an embodiment including the axial bearing or thrust bearing, the shaft 212A can include a thrust collar attached to the shaft 212A, e.g., press-fitted or otherwise attached around the shaft, in which the gas bearing 230 is provided around a thrust surface of the thrust collar. The gas bearing 230 receives the high pressure gas from the high pressure gas source and distributes the high pressure gas between the surface layer of the gas bearing 230 and the thrust surface such that it forms a layer of flowing pressurized fluid film between the bearing housing 231 and the thrust surface. This layer of flowing pressurized fluid supports the shaft in the axial direction and offsets any axial load applied to the compressor. The high pressure gas then exits, e.g., vents, via the gas bearing outlet, for example, to the compressor housing and/or the pressure reducer 245 and returns to the heat transfer circuit via the suction inlet of the first compressor. In such a manner, the gas bearing(s) supports the shaft and its axial load to ensure that the shaft stays in its correct position in the axial direction.

In an embodiment, the pressure reducer 245 can include a controller 250 for controlling the vent pressure at the outlet(s) 234 of the bearing housing(s) 231. The controller 250 can receive data from a number of different sources for monitoring the condition of the compressor, including, but not limited to, pressure sensor(s) at or near the gas bearing(s) inlet(s) and/or outlet(s), vibration sensor(s) on the housing of the compressor, pressure sensor(s) at the suction of the compressor(s), level sensors on the high pressure gas source, temperature sensors on the discharge of the compressors, condenser, evaporator, expander, of the ambient temperature, or the like, pressure sensors on the high pressure gas source or discharge of the compressors, inlet guide vane positions, rotational speed of the compressor(s), or the like. The controller can then control the pressure reducer 245, for example, by controlling flow through a venturi, e.g., for example, by turning on and off the vacuum pump system, adjusting positioning, or controlling the throat size, or controlling the inlet guide vanes of the compressor and/or valves from the outlet(s) 234 of the bearing housing(s) 231, to reduce the vent pressure at the outlet of the bearing housing. The controller can include a processor and memory storing a set of non-volatile instructions, which when executed, adjust the position of the inlet guide vanes to induce a higher vacuum pressure, e.g., position the inlet guide vanes in a partially closed position. For example, the controller 250 can partially close the inlet guide vanes to reduce the vent pressure in the bearing housing, when the difference between the inlet pressure, e.g., 80 PSI, of the gas bearing 230 and the outlet pressure, e.g., 20 PSI, of the gas bearing is less than 60 PSI or when the compressor increases the rotational speed of the shaft, e.g., from 50,000 RPM to 80,000 RPM. It is appreciated that while the control is discussed with respect to a single speed or differential pressure, the control of the vent pressure can be varied and/or continuously adjusted depending on the compressor system and needs thereof. It should also be appreciated that a "controller" as described herein may include multiple discrete or interconnected components that include a memory (not shown) and a processor (not shown) in an embodiment or connected to the main controller of the compressor/heat transfer circuit system.

In an embodiment, during operation of the two-stage compressor 211, the two-stage compressor 211 compresses a working fluid received at a suction inlet of the compressor 211. The gas bearings 230 receive the high pressure gas from the high pressure gas source and distribute the high pressure gas between the surface layer of the gas bearing(s) 230 and the shaft 212A, 213A such that it forms a layer of flowing pressurized fluid film between the bearing housing(s) 231 and the shaft. This layer of flowing pressurized fluid supports the shaft in the radial direction and offsets any radial load produced by the compressor. The high pressure gas then exits, e.g., vents, via the gas bearing outlet(s) 234 and returns to the heat transfer circuit 210 via the suction inlet of the first compressor 212. The gas bearing(s) 230 can have a clearance between the shaft and the gas bearing 230 at or about 2 microns to at or about 100 microns. In an embodiment, the clearance can be about or less than 25 microns by controlling and/or maintaining the differential pressure across the gas bearing(s) 230, e.g., of at least 60 PSI. For example, the discharge of the compressor can provide a high pressure gas, e.g., the working fluid, that is provided to the fluid inlet(s) 232 of the bearing housing(s) 231 at or around 80 PSI. As the high pressure gas is distributed by the gas bearing(s) 230, the pressure at the gas bearing outlet(s) 234 can be at a vent pressure at or around 20 PSI, and can be returned to the suction of the compressor.

The venting of the high pressure gas can be operated in a first state in which the high pressure gas that exits the gas bearing outlet(s) 234 can operate at a first pressure and a first volume. The differential pressure, however, may need to be controlled and/or adjusted to improve the stability of the shaft and/or maintain the differential pressure across the gas bearing, e.g., to prevent and/or reduce the non-synchronous rotation of the shaft with respect to the gas bearing. For example, the operating conditions in the HVACR system may change, for example, due to decreased load and/or decreased discharge pressure of the compressor which may result in a lower differential pressure across the gas bearing. Further, as the rotational speed of the compressor 211 increases, a higher differential pressure may be needed to provide the proper support of the rotating shaft. If the differential pressure across the gas bearing(s) 230 is not controlled at the predetermined value, the shaft may rotate non-synchronously with respect to the gas bearing(s) which may increase the size of the orbit of the shaft with respect to the gas bearing(s), e.g., rotor whirl due to cross-coupled forces, for example, due to the discharge pressure of the compressor, imbalances, rubbing of the compressor components, vibrations, or the like. Thus, in an embodiment, the compressor 211 can operate in a second state in which the suction pressure is decreased to a second pressure and a second volume. That is, in order to compensate for the reduction in the pressure of the high pressure gas at the inlet 232 of the bearing 230 or to increase the differential pressure, the pressure reducer 245 can be used to control and/or maintain the differential pressure across the gas bearing 230 by reducing the vent pressure at the outlet of the gas bearing 230.

In an embodiment, the pressure reducer 245 can be used to control and/or maintain the differential pressure across the gas bearing(s) 230 at the predetermined value of the differential pressure by reducing the vent pressure at the outlet 234 of the gas bearing(s) 230. For example, when the pressure reducer 245 includes the inlet guide vanes of a centrifugal compressor, the inlet guide vanes can be controlled to be positioned at least partially closed to maintain suction pressure but create a lower pressure after the inlet guide vanes to reduce the vent pressure at the gas bearing outlet(s) 234. By decreasing the pressure at the gas bearing outlet(s) 234, the differential pressure can be controlled and/or maintained at the predetermined value of the differential pressure, e.g., at or above 60 PSI, even when an abnormal condition occurs, e.g., an event that causes the supply pressure of the high pressure gas to be lowered. That is, if the supply pressure of the high pressure gas to the gas bearing 230 is operating at 80 PSI and drops to 70 PSI, the vent pressure at the outlet 234 of the bearing housing(s) 231 which was operating at 20 PSI can be decreased to 10 PSI to maintain the differential pressure of 60 PSI by controlling the position of the inlet guide vanes.

Similarly, to improve stability of the shaft at higher rotational speeds, e.g., when increasing the compressor speed from 50,000 to 60,000 RPM, the differential pressure can be increased to provide additional support of the shaft. For example, when the pressure reducer 245 includes the inlet guide vanes of a centrifugal compressor, the inlet guide vanes can be controlled to close or partially close to create a higher suction pressure at the suction of the compressor which reduces the vent pressure at the gas bearing outlet(s) 234. That is, if the supply pressure of the high pressure gas to the gas bearing 230 increases from 80 PSI to 85 PSI, the vent pressure at the outlet 234 of the bearing housing(s) 231 can be decreased from 20 PSI to 15 PSI to increase the differential pressure from 60 PSI to 70 PSI by controlling the position of the inlet guide vanes.

Figure 3:
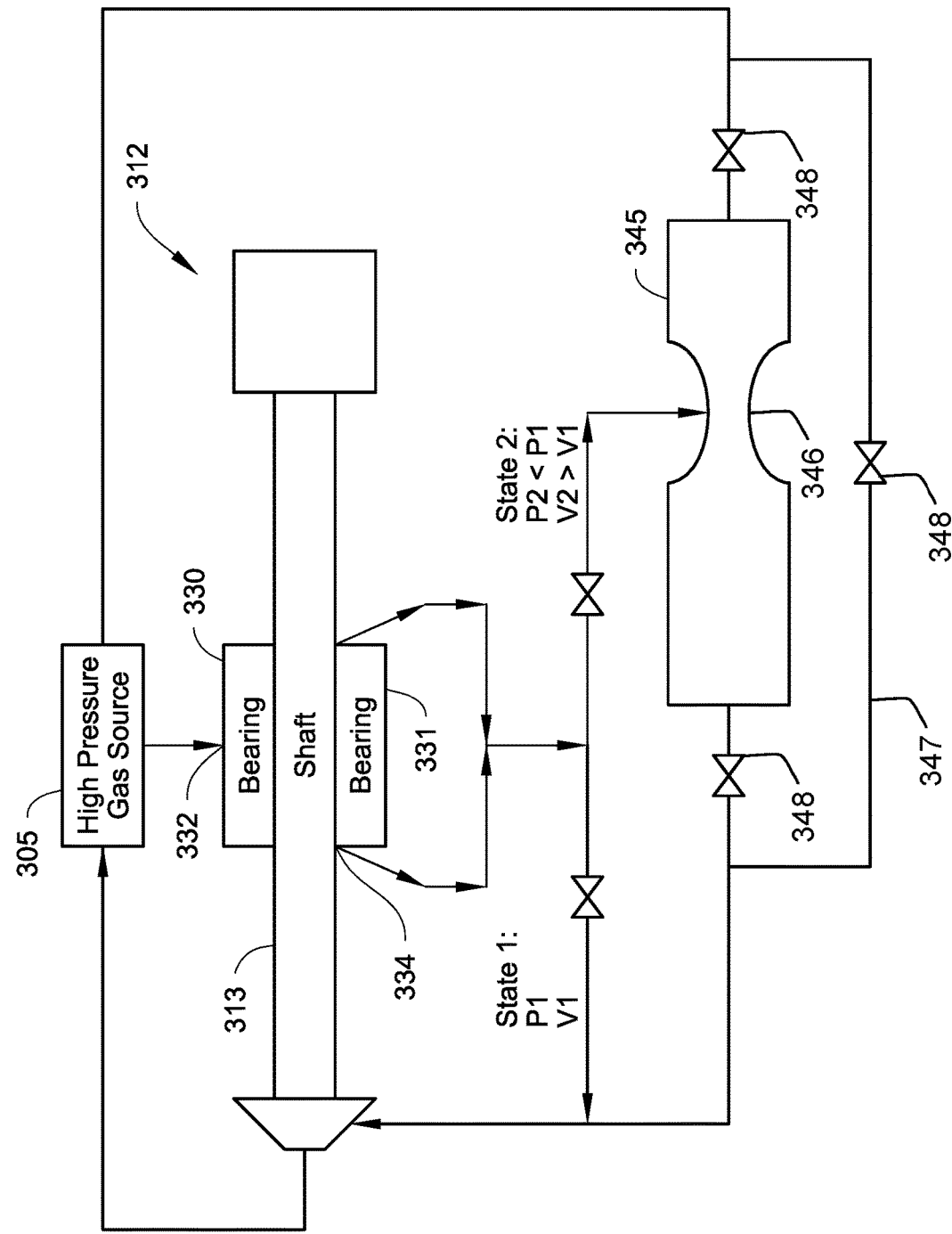
FIG. 3 is a schematic view of a gas bearing having a pressure reducer, according to an embodiment.

FIG. 3 is a schematic view of a gas bearing 330 having a pressure reducer 345, according to an embodiment. The gas bearing 330 in FIG. 3 can be utilized in a compressor (e.g., compressor 12 in FIG. 1 and/or compressor 211 in FIG. 2) of a heat transfer circuit (e.g., heat transfer circuit 10 in FIG. 1) of an HVACR system. The heat transfer circuit can include a compressor 312, a high pressure gas source 305 that can include heat transfer circuit components, such as a condenser, an expander, and an evaporator, and gas bearings 330. In an embodiment, the compressor 312 can be a single stage, two-stage, or multistage compressor which can be a centrifugal compressor, a screw compressor, a scroll compressor, or the like. In an embodiment of the centrifugal compressor, the centrifugal compressor can operate at different speed ranges based on, for example, the compressor size and type. For example, in an embodiment, the centrifugal compressor can operate from at or about 10,000 revolutions per minute (RPM) to at or about 50,000 revolutions per minute (RPM) and up to at or about 150,000 revolutions per minute (RPM) or therebetween. The centrifugal compressor includes a housing and a shaft that rotates relative to the housing at the controlled RPMs. Other features of the heat transfer circuit, compressor, gas bearing and/or pressure reducer may be the same as or similar to features of the system as discussed above in FIGS. 1-2. The pressure reducer 345 includes a venturi which uses the working fluid at the suction of the compressor as the motive fluid for the venturi, as further discussed below.

The compressor 312, as shown in FIG. 3, is a centrifugal compressor that compresses the working fluid and supplies the compressed working fluid to the desired outlet pressure, e.g., based on temperature and/or pressure needs of the system. The relatively higher-pressure gas is discharged from the compressor 312 and flows through refrigerant lines to the various heat transfer circuit components, e.g., the condenser, expander, and evaporator. Along the various heat transfer circuit components, the working fluid can be provided to the gas bearing or can be provided to a fluidly separate external supply system (for example, external supply system 240 in FIG. 2) for supplying high pressure fluid to the gas bearing. The external supply system can include various components, for example, a receiver tank, a heater, a pump, a filter, or other processing equipment for the working fluid.

The gas bearing 330 radially supports a shaft 313 of the centrifugal compressor 312 in the housing of the compressor. The gas bearing 330 can include a bearing housing 331 having a fluid inlet 332 and an outlet 334. A high pressure gas source 305 is fluidly connected to the fluid inlet 332 of the bearing housing 331 for supplying high pressure fluid. The gas bearing 330 is configured such that the gas bearing uses the high pressure fluid to create a fluid layer between the surface of the gas bearing and the shaft to support the shaft 313 when the shaft 313 is rotating. In an embodiment, the fluid inlet 332 of the bearing housing 331 that is connected to the high pressure gas source 305 can be connected to at least one refrigerant line of the heat transfer circuit components and/or to the external supply system of a high pressure fluid (e.g., external supply system 240 in FIG. 2).

The outlet(s) 334 of the bearing housing 331 is fluidly connected to the suction of the compressor 312 and/or is connected to the pressure reducer 345 to vent the high pressure gas from the gas bearing. It is appreciated that each of the outlet(s) of the bearing housing 331 can be combined as a single inlet to the suction of the compressor 312 and/or to the pressure reducer 345 so that the pressure reducer 345 can be used to decrease the vent pressure in the bearing housings 331. That is, the pressure reducer 345 can be used to lower the vent pressure at the outlet(s) 334 of the gas bearings 330 so that the differential pressure can be controlled and/or maintained across the gas bearing 330 at a predetermined value, e.g., of at least 40 PSI or at least 60 PSI or at or around 100 PSI.

The pressure reducer 345 can include a venturi that is connected to the suction line of the compressor 312, in which the flow of the working fluid at the suction of the compressor 312 is used as the motive fluid for the venturi. It is appreciated that in an embodiment, the motive fluid is at the lowest pressure provided to the compressor 312, in which the venturi creates a localized low pressure pocket for the venting of the bearings at the throat 346 of the venturi. A bypass line 347 can be provided around the venturi for isolating the venturi during operations or for controlling an amount of motive fluid flow through the venturi. Optionally, a plurality of valves 348 can be provided in the suction line and/or the bypass line to isolate and/or use the venturi 345. The outlet(s) 334 of the bearing housing 331, the bypass line 347, and/or the plurality of valves 348 are connected in a way such that the high pressure gas at the outlet(s) 334 can be drawn into the venturi 345, e.g., at or near a throat 346 of the venturi as the motive fluid flows through the venturi 345.

While FIG. 3 shows the gas bearing(s) 330 as a single unit, it is appreciated that the gas bearing(s) 330 can be a single bearing or multiple bearings that radially support the shaft(s) in which each bearing receives the high pressure fluid at the fluid inlet of the respective bearing housing and vents the working fluid at the outlet of the respective bearing to the suction of the compressor. For example, the gas bearing(s) 330 can include a plurality of radial bearings that radially support the shaft of the compressor so that the shaft rotates concentrically within the gas bearing by forming a fluid layer between the shaft and a surface layer of the gas bearing. In addition to or alternatively, the gas bearing(s) 330 can include multiple inlets and multiple outlets for distributing the high pressure fluid between the shaft and the bearing housing(s). It is appreciated that the distributed high pressure fluid is pressed between the surface layer and the shaft such that it forms a layer of flowing pressurized fluid between the bearing housing(s) and the shaft(s). This layer of flowing pressurized gas supports the shaft in the radial direction and the radial loads produced by the compressor. In such a manner, the gas bearing(s) supports the shaft and its radial load to ensure that the shaft stays in its correct position in the radial direction.

For example, in a non-limiting embodiment, a shaft can be provided within an aperture of the bearing housing 331. The shaft includes a longitudinal axis that extends along a length of the shaft. In an embodiment, a clearance between the shaft and the gas bearing 330 can be at or about 2 microns to at or about 100 microns. In an embodiment, the clearance can be about or less than 25 microns. A larger clearance means lower stiffness and larger leakage through the gas bearing 330. The selection of the clearance can depend, for example, upon the required stiffness of the rotor-bearing system. In operation, the shaft rotates about the longitudinal axis. The shaft is subject to deflection in the radial direction. To reduce an amount of movement in the radial direction, the pressure reducer 345 can be used to reduce the outlet pressure of the gas bearing 330 to increase the differential pressure across the gas bearing 330. In an embodiment, the differential pressure can be, e.g., at or above 60 PSI.

In an embodiment, the pressure reducer 345 can include a controller (for example, controller 250 in FIG. 2) for controlling the vent pressure at the outlet(s) 334 of the bearing housing(s) 331. The controller can receive data from a number of different sources for monitoring the condition of the compressor, including, but not limited to, pressure sensor(s) at or near the gas bearing(s) inlet(s) and/or outlet(s), vibration sensor(s) on the housing of the compressor, pressure sensor(s) at the suction of the compressor(s), level sensors on the high pressure gas source, temperature sensors on the discharge of the compressors, condenser, evaporator, expander, of the ambient temperature, or the like, pressure sensors on the high pressure gas source or discharge of the compressors, rotational speed of the compressor(s), or the like. The controller can then control the pressure reducer 345, for example, by controlling flow through the venturi, e.g., for example, by turning on and off the vacuum pump system, adjusting valve positioning, or controlling the throat size, to reduce the vent pressure at the outlet of the bearing housing. The controller can include a processor and memory storing a set of non-volatile instructions, which when executed, adjust the control of the venturi 345 to induce a higher vacuum pressure. It is appreciated that while the control is discussed with respect to certain speeds or differential pressures, the control of the vent pressure can be varied and/or continuously adjusted depending on the compressor system and needs thereof. It should also be appreciated that a "controller" as described herein may include multiple discrete or interconnected components that include a memory (not shown) and a processor (not shown) in an embodiment or connected to the main controller of the compressor/heat transfer circuit system.

In an embodiment, during operation of the compressor 312, the compressor 312 compresses a working fluid received at a suction inlet of the compressor. The gas bearing 330 receives the high pressure gas from the high pressure gas source and distributes the high pressure gas between the surface layer of the gas bearing 330 and the shaft 313 such that it forms a layer of flowing pressurized fluid film between the bearing housing 331 and the shaft 313. This layer of flowing pressurized fluid supports the shaft in the radial direction and offsets radial load produced by the compressor 312. The high pressure gas then exits, e.g., vents out of, the gas bearing outlet(s) 334 and returns to the heat transfer circuit via the suction inlet of the compressor 312. The gas bearing 330 can have a clearance between the shaft and the gas bearing 330 at or about 2 microns to at or about 100 microns. In an embodiment, the clearance can be about or less than 25 microns by controlling and/or maintaining the differential pressure across the gas bearing 330, e.g., of at least 60 PSI. For example, the discharge of the compressor can provide a high pressure gas, e.g., the working fluid, that is provided to the fluid inlet 332 of the bearing housing 331 at or around 80 PSI. As the high pressure gas is distributed by the gas bearing 330 and returned to the suction of the compressor, the pressure at the gas bearing outlet 334 can be at a vent pressure at or around 20 PSI.

The venting of the high pressure gas can operate in a first state in which the high pressure gas that exits the gas bearing outlets 334 can operate at a first pressure P1 and a first volume V1. The differential pressure, however, may need to be controlled and/or adjusted to improve the stability of the shaft and/or maintain the differential pressure across the gas bearing, e.g., to prevent and/or reduce the non-synchronous rotation of the shaft with respect to the gas bearing. For example, the operating conditions in the HVACR system may change, for example, due to decreased load and/or reduced speeds and/or higher ambient temperatures and/or decreased discharge pressure of the compressor which may result in a lower differential pressure across the gas bearing. Further, as the rotational speed of the compressor 312 increases, a higher differential pressure may be needed to provide the proper support of the rotating shaft. In order to compensate for the reduction in the pressure of the high pressure gas at the inlet 332 of the bearing 330 or to increase the differential pressure, the pressure reducer 345 can be used to control and/or maintain the differential pressure across the gas bearing 330 at the predetermined value of the differential pressure by reducing the vent pressure at the outlet of the gas bearing 330.

When the vent pressure at the outlet of the gas bearing 330 needs to be decreased to maintain the differential pressure or to increase the differential pressure, the controller (for example, controller 250 in FIG. 2) can be used to control the flow of the working fluid through the venturi 345 to increase the amount of the high pressure gas drawn from the outlet 334 of the gas bearing 330 and/or reduce the venting of the high pressure gas directly to the suction of the compressor 312, e.g., by controlling of valves. That is, in an embodiment, the venting of the high pressure gas can operate in a second state in which the suction pressure is decreased to a second pressure P2 that is less than P1 and/or a second volume V2 that is greater than the first volume V1. For example, as the amount of working fluid is increased through the venturi, the venturi 345 creates a stronger vacuuming effect at the venturi which lowers the vent pressure at the outlet of the bearing housing 331 resulting in the second pressure P2 being lower than the first pressure P1. Since the flow of the motive fluid can be controlled to increase the suction pressure at or near the venturi 345, the amount of high pressure gas drawn from the gas bearing 430 can be increased, e.g., V2>V1, so that the vent pressure at the outlet 334 of the bearing housing 331 can be lowered to control and/or maintain the differential pressure. For example, if the compressor 312 is operating at 50,000 RPM and the ambient temperature rises, the discharge pressure of the compressor 312 can drop from 80 PSI to 70 PSI which results in the supply pressure of the high pressure gas to the gas bearing 330 dropping to 70 PSI. In order to control and/or maintain the differential pressure at or above 60 PSI, the flow of motive fluid can be controlled to decrease the vent pressure at the outlet of the bearing housing(s) 331 from 20 PSI to 10 PSI.

Similarly, to improve stability of the shaft at higher rotational speeds, e.g., when increasing the compressor speed from 50,000 to 60,000 RPM, the differential pressure can be increased to provide additional support of the shaft. For example, the venturi can be controlled so that the flow of motive fluid is increased to create a higher suction pressure to reduce the vent pressure at the gas bearing outlet(s) 334. That is, if the supply pressure of the high pressure gas to the gas bearing 330 increases from 80 PSI to 85 PSI, the vent pressure at the outlet 334 of the bearing housing(s) 331 can be decreased from 20 PSI to 15 PSI to increase the differential pressure from 60 PSI to 70 PSI.

In another embodiment, in order to increase or maintain the differential pressure due to changes in the operating conditions of the compressor, the controller (for example, controller 250 in FIG. 2) can be used to control the flow, e.g., control of valves, of the working fluid through the venturi 345 to decrease the amount of the high pressure gas drawn from the outlet of the gas bearing 330. For example, if the compressor 312 was operating at 100 PSID from discharge to suction, and increased to 200 PSID, the pressure at the outlet 334 of the bearings 330 can be increased from 40 PSI to 100 PSI to maintain or increase the pressure differential across the bearings to 100 PSI, instead of controlling the supply pressure to the inlet 332 of the gas bearings 330, e.g., by throttling the supply to the gas bearings 330. Since the flow of the motive fluid can be controlled to be decreased, the vent pressure at the outlet 334 of the bearing housing 331 can be raised to control and/or maintain the differential pressure.

It is also appreciated that, in an embodiment, the venturi includes an adjustable throat and the bypass line can be optional. In the venturi with the adjustable throat, the throat dimension of the venturi can be adjusted, e.g., using a plunger, gate, plates, valves, or the like that is able to reduce the cross-sectional area of the throat of the venturi so that the amount and/or velocity of the motive fluid flow through the venturi can be controlled and/or adjusted. It is appreciated that in this embodiment, the entirety of the high pressure gas from the outlet 334 of the gas bearing 330 can be vented to the venturi. In order to decrease the vent pressure of the gas bearing 330, the area of the throat can be decreased to increase the suction pressure of the pressure reducer 345, by increasing at least the velocity of the motive fluid through the venturi.

Figure 4:
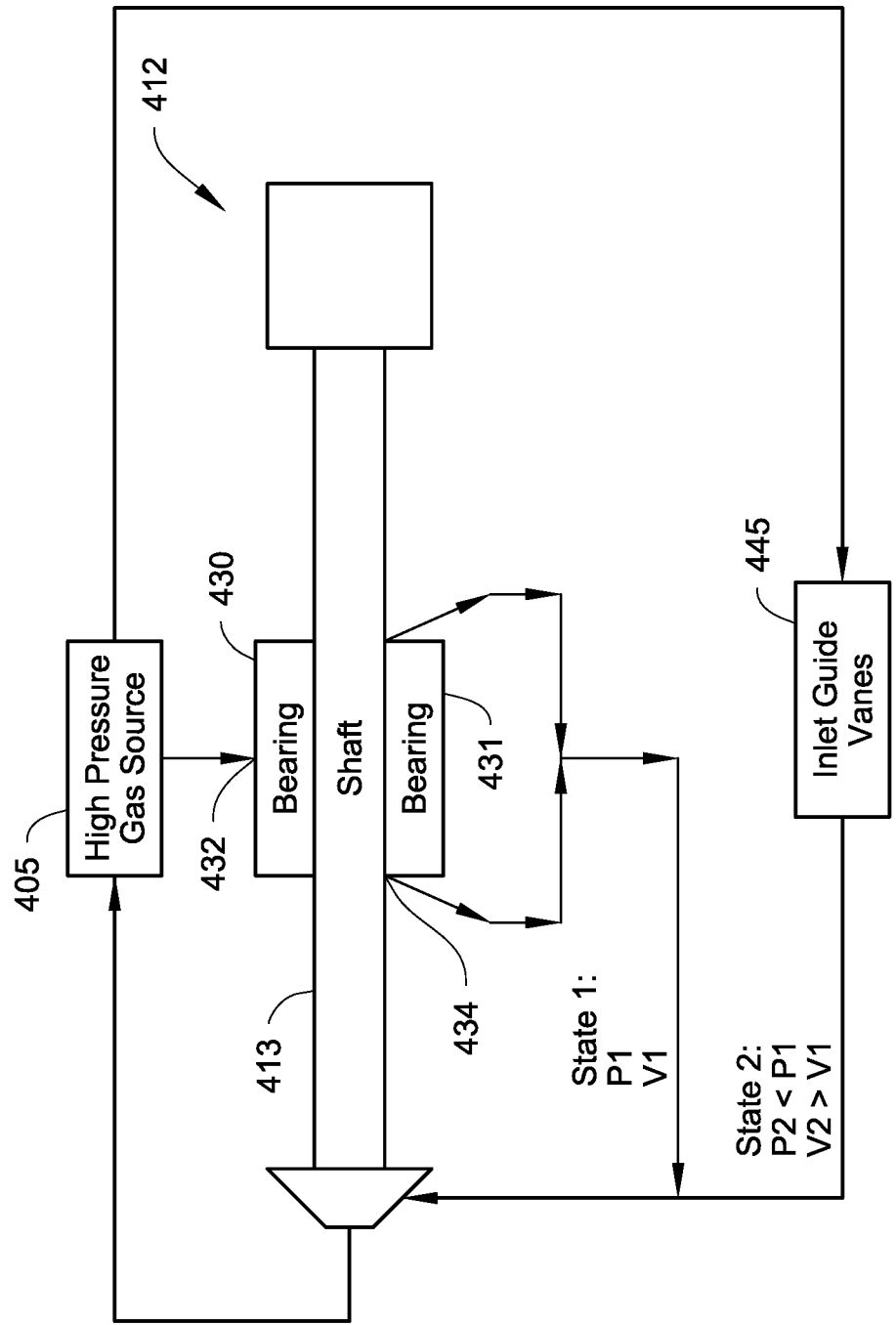
FIG. 4 is a schematic view of a gas bearing having a pressure reducer, according to an embodiment.

FIG. 4 is a schematic view of a gas bearing 430 having a pressure reducer 445, according to an embodiment. The gas bearing 430 in FIG. 4 can be utilized in a centrifugal compressor (e.g., compressor 12 in FIG. 1 and/or compressor 211 in FIG. 2) of a heat transfer circuit (e.g., heat transfer circuit 10 in FIG. 1) of an HVACR system. The heat transfer circuit can include a compressor 412, a high pressure gas source 405 that can include heat transfer circuit components, such as a condenser, an expander, and an evaporator, and gas bearings 430. In an embodiment, the compressor 412 can be a single stage, two-stage, or multistage compressor which can be a centrifugal compressor, a screw compressor, a scroll compressor, or the like. In an embodiment of the centrifugal compressor, the centrifugal compressor can operate at different speed ranges based on, for example, the compressor size and type. For example, in an embodiment, the centrifugal compressor can operate from at or about 10,000 revolutions per minute (RPM) to at or about 50,000 revolutions per minute (RPM) and up to at or about 150,000 revolutions per minute (RPM) or therebetween. The centrifugal compressor includes a housing and a shaft that rotates relative to the housing at the controlled RPMs. Other features of the heat transfer circuit, compressor, gas bearing and/or pressure reducer may be the same as or similar to features of the system as discussed above in FIGS. 1-3. The pressure reducer 445 includes the inlet guide vanes of the compressor 412, as further discussed below.

The compressor 412, as shown in FIG. 4, is a centrifugal compressor that compresses the working fluid and supplies the compressed working fluid to the desired outlet pressure, e.g., based on temperature and/or pressure needs of the system. The relatively higher-pressure gas is discharged from the compressor 412 and flows through refrigerant lines to the various heat transfer circuit components, e.g., the condenser, expander, and evaporator. Along the various heat transfer circuit components, the working fluid can be provided to the gas bearing or can be provided to a fluidly separate external supply system (for example, external supply system 240 in FIG. 2) for supplying high pressure fluid to the gas bearing. The external supply system can include various components, for example, a receiver tank, a heater, a pump, a filter, or other processing equipment for the working fluid.

The gas bearing 430 radially supports a shaft 413 of a centrifugal compressor 412 in the housing of the compressor. The gas bearing 430 can include a bearing housing 431 having a fluid inlet 432 and an outlet 434. A high pressure gas source 405 is fluidly connected to the fluid inlet 432 of the bearing housing 431 for supplying high pressure fluid. The gas bearing 430 is configured such that the gas bearing uses the high pressure fluid to create a fluid layer between the surface of the gas bearing and the shaft to radially support the shaft 413 when the shaft 413 is rotating. In an embodiment, as shown in FIG. 4, the fluid inlet 432 of the bearing housing 431 is connected to the high pressure gas source 405 which can be connected to at least one refrigerant line of the heat transfer circuit components and/or to the external supply system of a high pressure fluid (e.g., external supply system 240 in FIG. 2).

The outlet(s) 434 of the bearing housing 431 is fluidly connected to the suction of the compressor 412. It is appreciated that each of the outlets 434 of the bearing housing 431 can be combined so that the pressure reducer 445 can be used to decrease the vent pressure in the bearing housings 431. That is, the pressure reducer 445 can be used to lower the vent pressure at the outlets 434 of the gas bearings 430 so that a differential pressure can be controlled and/or maintained across the gas bearing 430 at a predetermined value, for example, of at least 40 PSI or at least 60 PSI or at or around 100 PSI.

In the embodiment, the pressure reducer 445 can include the inlet guide vanes of the compressor 412. It is appreciated that the inlet guide vanes are typically closed at start-up of the compressor and gradually opened to direct the flow of fluid to the impeller of the compressor 412. After start-up of the compressor 412, the inlet guide vanes are typically in the fully opened position when the compressor is operating at speed, e.g., at 50,000 RPM depending on the compressor design, which the operating speed and/or the inlet guide vanes position may be more or less or can vary depending on the mode of operation. Since the outlet(s) 434 of the bearing housing 431 are connected to the suction of the compressor 412, it is appreciated that the inlet guide vanes can be controlled or adjusted to the closed or partially closed position to reduce the vent pressure of the bearing housing 431. It is appreciated that the control of the position of the inlet guide vanes can be a balance between the operating speed of the compressor 412 and the stability of the bearings, in which the amount in which the inlet guide vanes are partially closed is balanced with the optimum and/or most efficient operation of the compressor for the desired capacity and/or temperatures.

While FIG. 4 shows the gas bearing(s) 430 as a single unit, it is appreciated that the gas bearing(s) 430 can be a single bearing or multiple bearings that radially support the shaft(s) in which each bearing receives the high pressure fluid at the fluid inlet of the respective bearing housing and vents the working fluid at the outlet of the respective bearing to the suction of the compressor. For example, the gas bearing(s) 430 can include a plurality of radial bearings that radially support the shaft of the compressor so that the shaft rotates concentrically within the gas bearing by forming a fluid layer between the shaft and a surface layer of the gas bearing. In addition to or alternatively, the gas bearing(s) 430 can include multiple inlets and multiple outlets for distributing the high pressure fluid between the shaft and the bearing housing(s). It is appreciated that the distributed high pressure fluid is pressed between the surface layer and the shaft such that it forms a layer of flowing pressurized fluid between the bearing housing(s) and the shaft(s). This layer of flowing pressurized gas supports the shaft in the radial direction and the radial loads produced by the compressor. In such a manner, the gas bearing(s) supports the shaft and its radial load to ensure that the shaft stays in its correct position in the radial direction.

For example, in a non-limiting embodiment, a shaft can be provided within an aperture of the bearing housing 431. The shaft includes a longitudinal axis that extends along a length of the shaft. In an embodiment, a clearance between the shaft and the gas bearing 430 can be at or about 2 microns to at or about 100 microns. In an embodiment, the clearance can be about or less than 25 microns. A larger clearance means lower stiffness and larger leakage through the gas bearing 430. The selection of the clearance can depend, for example, upon the required stiffness of the rotor-bearing system. In operation, the shaft rotates about the longitudinal axis. The shaft is subject to deflection in the radial direction. To reduce an amount of movement in the radial direction, the pressure reducer 445 can be used to reduce the outlet pressure of the gas bearing 430 to increase the differential pressure across the gas bearing 430. In an embodiment, the differential pressure can be, e.g., at or above 60 PSI.

In an embodiment, the pressure reducer 445 can include a controller (for example, controller 250 in FIG. 2) for controlling the vent pressure at the outlet(s) 434 of the bearing housing(s) 431. The controller can receive data from a number of different sources for monitoring the condition of the compressor, including, but not limited to, pressure sensor(s) at or near the gas bearing(s) inlet(s) and/or outlet(s), vibration sensor(s) on the housing of the compressor, pressure sensor(s) at the suction of the compressor(s), level sensors on the high pressure gas source, temperature sensors on the discharge of the compressors, condenser, evaporator, expander, of the ambient temperature, or the like, pressure sensors on the high pressure gas source or discharge of the compressors, inlet guide vane positions, rotational speed of the compressor(s), or the like. The controller can then control the pressure reducer 445, for example, by controlling the position of the inlet guide vanes to reduce the vent pressure at the outlet of the bearing housing. The controller can include a processor and memory storing a set of non-volatile instructions, which when executed, adjust the control of the positioning of the inlet guide vanes to induce a higher vacuum pressure. It is appreciated that while the control is discussed with respect to certain speeds or differential pressures, the control of the vent pressure can be varied and/or continuously adjusted depending on the compressor system and needs thereof. It should also be appreciated that a "controller" as described herein may include multiple discrete or interconnected components that include a memory (not shown) and a processor (not shown) in an embodiment or connected to the main controller of the compressor/heat transfer circuit system.

In an embodiment, during operation of the compressor 412, the compressor 412 compresses a working fluid received at a suction inlet of the compressor. The gas bearing 430 receives the high pressure gas from the high pressure gas source and distributes the high pressure gas between the surface layer of the gas bearing 430 and the shaft 413 such that it forms a layer of flowing pressurized fluid film between the bearing housing 431 and the shaft 413. This layer of flowing pressurized fluid supports the shaft 413 in the radial direction and offsets radial load produced by the compressor 412. The high pressure gas then exits, e.g., vents out of, the gas bearing outlet(s) 434 to the suction inlet of the compressor 412. The gas bearing 430 can have a clearance between the shaft 413 and the gas bearing 430 at or about 2 microns to at or about 100 microns. In an embodiment, the clearance can be about or less than 25 microns by controlling and/or maintaining the differential pressure across the gas bearing 430, e.g., of at least 60 PSI. For example, the discharge of the compressor can provide a high pressure gas, e.g., the working fluid, that is provided to the fluid inlet 432 of the bearing housing 431 at or around 80 PSI. As the high pressure gas is distributed by the gas bearing 430 and returned to the suction of the compressor, the pressure at the gas bearing outlet 434 can be at a vent pressure at or around 20 PSI.

The venting of the high pressure gas can be operated in a first state in which the high pressure gas that exits the gas bearing outlet(s) 434 can operate at a first pressure P1 and a first volume V1 by venting the high pressure gas directly to the suction of the compressor 412. The differential pressure, however, may need to be controlled and/or adjusted to improve the stability of the shaft and/or maintain the differential pressure across the gas bearing, e.g., to prevent and/or reduce the non-synchronous rotation of the shaft with respect to the gas bearing. For example, the operating conditions in the HVACR system may change, for example, due to decreased load and/or reduced speeds and/or higher ambient temperatures and/or decreased discharge pressure of the compressor which may result in a lower differential pressure across the gas bearing. Further, as the rotational speed of the compressor 412 increases, a higher differential pressure may be needed to provide the proper support of the rotating shaft. Thus, in an embodiment, the venting of the high pressure gas can be operated in a second state in which the suction pressure is decreased to a second pressure P2, e.g., P2<P1, and a second volume V2, in which V2>V1. That is, in order to compensate for the reduction in the pressure of the high pressure gas at the inlet 432 of the bearing 430 or to increase the differential pressure, the pressure reducer 445 can be used to control and/or maintain the differential pressure across the gas bearing 430 by reducing the vent pressure at the outlet of the gas bearing 430.

Thus, when the outlet pressure of the gas bearing 430 needs to be decreased to control and/or maintain the differential pressure, a controller (for example, controller 250 in FIG. 2) can be used to control the position of the inlet guide vanes. That is, as the inlet guide vanes are adjusted to the closed or partially closed position, a lower suction pressure is created at the suction inlet of the compressor 412, since the compressor is operating at speed resulting in a second pressure P2 at the suction that is lower than the first pressure P1. Since a lower pressure is attainable by adjusting the position of the inlet guide vanes, the amount of high pressure gas drawn from the gas bearing 430 can be increased, e.g., V2>V1, so that the vent pressure at the outlet of the bearing housing 431 can be lowered to control and/or maintain the differential pressure. For example, if the compressor 412 is operating at 50,000 RPM and the ambient temperature rises, the discharge pressure of the compressor 412 can drop from 80 PSI to 70 PSI which results in the supply pressure of the high pressure gas to the gas bearing 430 dropping to 70 PSI. In order to control and/or maintain the differential pressure at or above 60 PSI, the inlet guide vanes can be partially closed to decrease the vent pressure at the outlet of the bearing housing(s) 431 from 20 PSI to 10 PSI.

Similarly, to improve stability of the shaft at higher rotational speeds, e.g., when increasing the compressor speed from 50,000 to 60,000 RPM, the differential pressure can be increased to provide additional support of the shaft. For example, the inlet guide vanes can be controlled to close to create a higher suction pressure at the suction of the compressor which reduces the vent pressure at the gas bearing outlet(s) 434. That is, if the supply pressure of the high pressure gas to the gas bearing 430 increases from 80 PSI to 85 PSI, the vent pressure at the outlet 434 of the bearing housing(s) 431 can be decreased from 20 PSI to 15 PSI to increase the differential pressure from 60 PSI to 70 PSI by controlling the position of the inlet guide vanes.

Aspects

It is to be appreciated that any one of aspects 1-14 can be combined with any one of aspects 15-17. Any one of aspects 15-17 can be combined with any one of aspects 1-14.

Aspect 1. A heat transfer circuit, comprising: a compressor, a condenser, an expander, and an evaporator that are fluidly connected together, wherein the compressor includes a housing and a shaft rotatable relative to the housing to compress a working fluid received at a suction inlet, the shaft being supported by a gas bearing, the gas bearing including a bearing housing having a fluid inlet and an outlet; a high pressure gas source fluidly connected to the fluid inlet of the bearing housing for supplying high pressure fluid to the fluid inlet of the gas bearing such that the gas bearing is configured to support the shaft when the shaft is rotating; and a pressure reducer connected to the outlet of the gas bearing for reducing a vent pressure of the gas bearing.

Aspect 2. The heat transfer circuit according to Aspect 1, wherein the high pressure gas source comprises a conduit extending from at least one of the condenser, the evaporator, or between the condenser and the evaporator and to the compressor, wherein the conduit is configured to supply a portion of the working fluid into the fluid inlet of the gas bearing.

Aspect 3. The heat transfer circuit according to Aspect 2, wherein the portion of the working fluid is a mixture of gas and liquid fluid from the heat transfer circuit.

Aspect 4. The heat transfer circuit according to any of Aspects 1-3, wherein the high pressure gas source is fluidly separate from the heat transfer circuit.

Aspect 5. The heat transfer circuit according to any of Aspects 1-4, wherein the compressor is a centrifugal compressor and the shaft is configured to rotate from at or about a minimum of 10,000 revolutions per minute to at or about a maximum of 150,000 revolutions per minute.

Aspect 6. The heat transfer circuit according to Aspect 5, wherein the pressure reducer includes inlet guide vanes of the centrifugal compressor, wherein the pressure reducer reduces the vent pressure of the gas bearing when the inlet guide vanes are at least partially closed.

Aspect 7. The heat transfer circuit according to any of Aspects 1-6, wherein the pressure reducer comprises a venturi connected to a suction line of the centrifugal compressor, wherein the pressure reducer is configured to use the working fluid as a motive fluid for the venturi to reduce the vent pressure of the gas bearing.

Aspect 8. The heat transfer circuit according to Aspect 7, further comprising a bypass line around the venturi.

Aspect 9. The heat transfer circuit according to Aspect 7, wherein a throat dimension of the venturi is adjustable.

Aspect 10. The heat transfer circuit according to any of Aspects 1-9, wherein the gas bearing is a radial bearing that supports the shaft radially.

Aspect 11. The heat transfer circuit according to any of Aspects 1-10, wherein the gas bearing is an aerostatic bearing or a hybrid bearing.

Aspect 12. The heat transfer circuit according to any of Aspects 1-11, wherein the aerostatic bearing is a foil bearing or a groove bearing or the hybrid bearing is made of porous media comprising a carbon-graphite material or is a fixed geometry orifice fed hybrid gas bearing.

Aspect 13. The heat transfer circuit according to any of Aspects 1-12, wherein a differential pressure across the gas bearing between a pressure of the fluid inlet of the bearing housing and the vent pressure is at least 60 PSI.

Aspect 14. The heat transfer circuit according to any of Aspects 1-13, further comprising a controller for controlling the pressure reducer.

Aspect 15. A method for controlling a differential pressure across a gas bearing, wherein the gas bearing supports a shaft of a compressor for a heat transfer circuit, the heat transfer circuit comprising the compressor, a condenser, an expansion device, and an evaporator that are fluidly connected together, the method comprising: compressing a working fluid received at a suction inlet of the compressor by rotation of the shaft; receiving a fluid from a high pressure gas source at a fluid inlet of a bearing housing of the gas bearing, wherein the gas bearing is configured to use the fluid from the high pressure gas source to form a film between a surface of the bearing housing and the shaft; venting the fluid from the bearing housing at an outlet of the bearing housing; and reducing a vent pressure of the fluid vented from the outlet of the bearing housing.

Aspect 16. The method according to Aspect 15, wherein the compressor is a centrifugal compressor, and wherein the vent pressure of the fluid vented from the outlet of the bearing housing is reduced by at least partially closing inlet guide vanes of the centrifugal compressor.

Aspect 17. The method according to any of Aspects 15-16, wherein the heat transfer circuit further comprises a venturi connected to the suction inlet of the compressor, and wherein the vent pressure of the fluid vented from the outlet of the bearing housing is reduced by increasing an amount of the working fluid through the venturi, wherein the working fluid is a motive fluid for the venturi.

The terminology used in this specification is intended to describe particular embodiments and is not intended to be limiting. The terms "a," "an," and "the" include plural forms as well, unless clearly indicated otherwise. The terms "comprises" and/or "comprising," when used, indicated the presence of the stated features, integers, steps, operations, elements, and/or components, but do not preclude the presence or addition of one or more other features, integers, steps, operations, elements, and/or components.

With regard to the preceding description, it is to be understood that changes may be made in detail, especially in matters of the construction materials employed and the shape, size, and arrangement of parts, without departing from the scope of the present disclosure. The word "embodiment" may, but does not necessarily, refer to the same embodiment. The embodiments and disclosure are examples only. Other and further embodiments may be devised without departing from the basic scope thereof, with the true scope and spirit of the disclosure being indicated by the claims that follow.

What is claimed is:

1. A heat transfer circuit, comprising:
    a compressor, a condenser, an expander, and an evaporator that are fluidly connected together,
    wherein the compressor includes a housing and a shaft rotatable relative to the housing to compress a working fluid received at a suction inlet, the shaft being supported by a gas bearing, the gas bearing including a bearing housing having a fluid inlet and an outlet;
    a high pressure gas source fluidly connected to the fluid inlet of the bearing housing for supplying high pressure fluid to the fluid inlet of the gas bearing such that the gas bearing is configured to support the shaft when the shaft is rotating;
    a pressure reducer fluidly connected to the outlet of the gas bearing configured to reduce a vent pressure of the gas bearing; and
    a controller for controlling the pressure reducer to reduce the vent pressure of the gas bearing to control and/or maintain a differential pressure across the gas bearing to a determined value to maintain a clearance distance between the gas bearing and the shaft.

2. The heat transfer circuit according to claim 1, wherein the high pressure gas source comprises a conduit extending from at least one of the condenser, the evaporator, or between the condenser and the evaporator and to the compressor, wherein the conduit is configured to supply a portion of the working fluid into the fluid inlet of the gas bearing.

3. The heat transfer circuit according to claim 2, wherein the portion of the working fluid is a mixture of gas and liquid fluid from the heat transfer circuit.

4. The heat transfer circuit according to claim 1, wherein the high pressure gas source is fluidly separate from the heat transfer circuit.

5. The heat transfer circuit according to claim 1, wherein the compressor is a centrifugal compressor and the shaft is configured to rotate from at or about a minimum of 10,000 revolutions per minute to at or about a maximum of 150,000 revolutions per minute.

6. The heat transfer circuit according to claim 5, wherein the pressure reducer includes inlet guide vanes of the centrifugal compressor, wherein the controller is configured to control the inlet guide vanes to an at least partially closed position to reduce the vent pressure of the gas bearing to control and/or maintain the differential pressure across the gas bearing to the determined value.

7. The heat transfer circuit according to claim 1, wherein the pressure reducer comprises a venturi connected to a suction line of the centrifugal compressor, wherein the pressure reducer is configured to use the working fluid as a motive fluid for the venturi to reduce the vent pressure of the gas bearing.

8. The heat transfer circuit according to claim 7, further comprising a bypass line around the venturi.

9. The heat transfer circuit according to claim 7, wherein a throat dimension of the venturi is adjustable.

10. The heat transfer circuit according to claim 1, wherein the gas bearing is a radial bearing that supports the shaft radially.

11. The heat transfer circuit according to claim 1, wherein the gas bearing is an aerostatic bearing or a hybrid bearing.

12. The heat transfer circuit according to claim 11, wherein the aerostatic bearing is a foil bearing or a groove bearing or the hybrid bearing is made of porous media comprising a carbon-graphite material or is a fixed geometry orifice fed hybrid gas bearing.

13. The heat transfer circuit according to claim 1, wherein a differential pressure across the gas bearing between a pressure of the fluid inlet of the bearing housing and the vent pressure is at least 60 PSI.

14. A method for controlling a differential pressure across a gas bearing, wherein the gas bearing supports a shaft of a compressor for a heat transfer circuit, the heat transfer circuit comprising the compressor, a condenser, an expander, and an evaporator that are fluidly connected together, the method comprising:
    compressing a working fluid received at a suction inlet of the compressor by rotation of the shaft;
    receiving a fluid from a high pressure gas source at a fluid inlet of a bearing housing of the gas bearing, wherein the gas bearing is configured to use the fluid from the high pressure gas source to form a film between a surface of the bearing housing and the shaft;

venting the fluid from the bearing housing at an outlet of the bearing housing; and reducing a vent pressure of the fluid vented from the outlet of the bearing housing by controlling a pressure reducer fluidly connected to the outlet of the bearing housing to control and/or maintain a differential pressure across the gas bearing to a determined value to maintain the film to have a clearance between the gas bearing and the shaft.

15. The method according to claim 14, wherein the compressor is a centrifugal compressor, and wherein the vent pressure of the fluid vented from the outlet of the bearing housing is reduced by at least partially closing inlet guide vanes of the centrifugal compressor.

16. The method according to claim 14, wherein the heat transfer circuit further comprises a venturi connected to the suction inlet of the compressor, and wherein the vent pressure of the fluid vented from the outlet of the bearing housing is reduced by increasing an amount of the working fluid through the venturi, wherein the working fluid is a motive fluid for the venturi.

* * * * *